(12) United States Patent  
Wu et al.

(10) Patent No.: US 9,294,941 B1
(45) Date of Patent: *Mar. 22, 2016

(54) PHASE TRANSFORMATION OF REPEATED SIGNALS

(71) Applicant: MARVELL INTERNATIONAL LTD., Hamilton (BM)

(72) Inventors: Songping Wu, Cupertino, CA (US); Quan Zhou, Sunnyvale, CA (US); Manyuan Shen, Milpitas, CA (US); Hongyuan Zhang, Fremont, CA (US); Hui-Ling Lou, Sunnyvale, CA (US)

(73) Assignee: MARVELL INTERNATIONAL LTD. (BM)

( * ) Notice: Subject to any disclaimer, the term of this patent is extended or adjusted under 35 U.S.C. 154(b) by 0 days.

This patent is subject to a terminal disclaimer.

(21) Appl. No.: 14/672,283

(22) Filed: Mar. 30, 2015

Related U.S. Application Data

(63) Continuation of application No. 12/546,907, filed on Aug. 25, 2009, now Pat. No. 8,995,568.

(60) Provisional application No. 61/094,567, filed on Sep. 5, 2008.

(51) Int. Cl.
*H04K 1/02* (2006.01)
*H04L 25/03* (2006.01)
*H04L 25/49* (2006.01)
*H04W 24/02* (2009.01)
*H04L 27/20* (2006.01)

(52) U.S. Cl.
CPC .............. *H04W 24/02* (2013.01); *H04L 27/20* (2013.01)

(58) Field of Classification Search
CPC ........ H03F 1/3247; H03F 3/24; H03F 1/3241; H04L 27/368; H03G 3/3042
USPC ................................................... 375/295–297
See application file for complete search history.

(56) References Cited

U.S. PATENT DOCUMENTS

| | | | |
|---|---|---|---|
| 4,972,510 A | 11/1990 | Guizerix et al. | |
| 5,463,660 A | 10/1995 | Fukasawa et al. | |
| 5,815,531 A | 9/1998 | Dent | |
| 6,434,188 B1 | 8/2002 | Hwang et al. | |
| 7,860,194 B2 | 12/2010 | Kim et al. | |
| 8,995,568 B1 * | 3/2015 | Wu et al. | 375/297 |
| 2001/0040914 A1 | 11/2001 | Kaewell | |
| 2002/0126648 A1 | 9/2002 | Kuchi et al. | |
| 2002/0150188 A1 | 10/2002 | Rudolf | |
| 2003/0142754 A1 | 7/2003 | Jung et al. | |
| 2003/0202460 A1 | 10/2003 | Jung et al. | |

(Continued)

OTHER PUBLICATIONS

Agilent Technologies, Inc., "Wireless LAN at 60 GHz—IEEE 802.11ad Explained," published in USA Feb. 7, 2012, 5990-9697EN, pp. 1-28.

*Primary Examiner* — Sam K Ahn
*Assistant Examiner* — James M Perez

(57) ABSTRACT

Devices, systems, methods, and other embodiments associated with phase based transformation of repeated signals are described. In one embodiment, an apparatus includes duplication logic configured to duplicate a string of data to form a duplicate string of data. Transformation logic is configured to modify phases associated with the string of data to generate a modified string of data. Signal generation logic is configured to generate a signal for wireless transmission where the signal having at least the modified string of data and the duplicate string of data.

20 Claims, 5 Drawing Sheets

(56) References Cited

U.S. PATENT DOCUMENTS

| | | |
|---|---|---|
| 2005/0088996 A1 | 4/2005 | Kawamura et al. |
| 2005/0232135 A1 | 10/2005 | Mukai et al. |
| 2006/0215784 A1 | 9/2006 | Nam et al. |
| 2007/0121706 A1 | 5/2007 | Nakamura et al. |
| 2008/0130813 A1 | 6/2008 | Hwang et al. |
| 2009/0004984 A1 | 1/2009 | Chrabieh et al. |
| 2009/0052577 A1 | 2/2009 | Wang |
| 2010/0239046 A1* | 9/2010 | Chun .................. H04L 1/0003 375/295 |
| 2012/0106654 A1 | 5/2012 | Eyvazkhani |

* cited by examiner

PHASE TRANSFORMATION OF REPEATED SIGNALS

CROSS REFERENCE TO RELATED APPLICATIONS

This disclosure is a continuation of U.S. Ser. No. 12/546,907 filed Aug. 25, 2009; now U.S. Pat. No. 8,995,568 which claims the benefit of U.S. provisional application Ser. No. 61/094,567, filed on Sep. 5, 2008, which are hereby incorporated by reference.

BACKGROUND

Wireless networks are used to transmit data between wireless devices. Mobile wireless devices often transmit data to a base station. To increase the amount of data the base station can receive and transmit, the base station may receive and transmit multiplexed data. For example, the data communicated between the mobile wireless device and the base station may be orthogonal frequency-division multiplexed (OFDM). OFDM modulation utilizes a digital multi-carrier modulation method. Closely spaced orthogonal sub-carriers are used to carry data. The data is divided into several parallel data streams or channels, one for each sub-carrier. Each sub-carrier is modulated with a conventional modulation scheme, such as quadrature phase shift keying (QPSK), at a low symbol rate. Even though the symbol rate is low, a total data rate may be maintained that is similar to a single-carrier modulation scheme in the same bandwidth.

Transmitting OFDM and QPSK wireless signals adds to the complexity of hardware used to transmit these signals. The use of multiple sub-carriers may increase the difficulty of transmitting signals with low noise-to-signal ratios. OFDM and QPSK signals may be sensitive to frequency synchronization problems and may have a high peak-to-average-power ratio (PAPR) and poor power efficiency. A better way of generating data for wireless transmission may be desirable.

SUMMARY

In one embodiment, an apparatus comprises duplication logic configured to duplicate a first string of data and a second string of data to form a first duplicate string of data and a second duplicate string of data. Transformation logic is configured to convert the first string of data into a string of conjugate values and to rotate symbols in the second string of data based at least on a constellation diagram to produce a string of rotated symbols, wherein data values of the string of rotated symbols are not conjugate values of the second string of data. Signal generation logic is configured to generate a signal for wireless transmission, the signal comprising at least the string of conjugate values, the first duplicate string of data, the string of rotated symbols, and the second duplicate string of data.

In another embodiment, an apparatus includes combining logic configured (i) to convert an input stream of data into a first string of symbols and (ii) to convert the symbols by mapping multiple bits of different strings of data to multiple symbols in accordance with a constellation diagram to form a second string of symbols. Copy logic is configured to generate duplicate strings of symbols that are copies of the first string of symbols and the second string of symbols from the combining logic. Conversion logic configured to map symbols of the duplicate strings of symbols to different phase values to generate strings of converted symbols, where each of the converted symbols has the same original amplitude and a different phase as those of a corresponding symbol in one of the duplicate streams. A port configured to output the first string of symbols, the second string of symbols, and the strings of converted symbols for wireless transmission.

In another embodiment, a method is described. The method comprises receiving at least one sequence of symbols; repeating at least a portion of the at least one sequence of symbols to form at least one repeated sequence of symbols; rotating the at least one repeated sequence of symbols by a phase to produce at least one rotated sequence of symbols; combining the at least one sequence of symbols and the at least one rotated sequence of symbols into a combined signal for wireless transmission; modulating the combined signal using spread quadrature phase-shift keying; and transmitting, after modulating, the combined signal as a wireless signal.

BRIEF DESCRIPTION OF THE DRAWINGS

The accompanying drawings, which are incorporated in and constitute a part of the specification, illustrate various example systems, methods, and other example embodiments of various aspects of the invention. It will be appreciated that the illustrated element boundaries (e.g., boxes, groups of boxes, or other shapes) in the figures represent one example of the boundaries. One of ordinary skill in the art will appreciate that in some examples one element may be designed as multiple elements or that multiple elements may be designed as one element. In some examples, an element shown as an internal component of another element may be implemented as an external component and vice versa. Furthermore, elements may not be drawn to scale.

DETAILED DESCRIPTION

Figure 1:
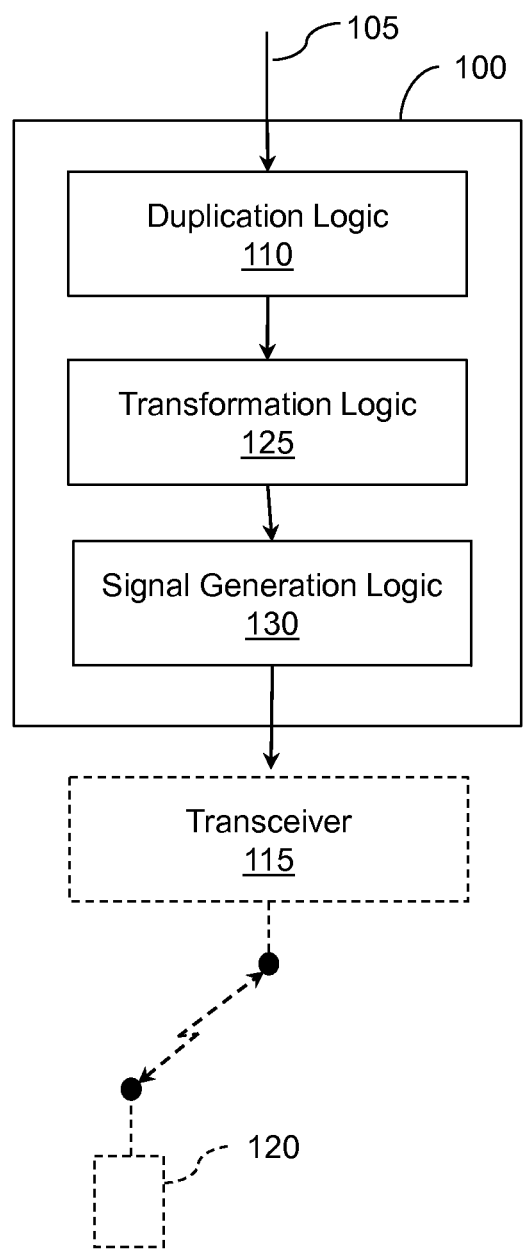
FIG. 1 illustrates an embodiment of an apparatus associated with phase transformation of repeated signals.

Described herein are example systems, methods, and other embodiments associated with phase transformation of repeated signals. Prior to discussing the present systems, consider the following example. In some wireless communications, a wireless transmitter transmits two copies of a string of symbols that represent wireless data. A device that receives both copies of the string of symbols can recover or correct data that has errors by using information from both copies of the strings. However, sending two copies of the same information increases the number of times the signal that represents the strings of symbols touches zero in the time domain. For example, the inverse fast Fourier transformation (IFFT) of the string of symbols is a time domain signal that touches zero more often when data is repeated. A signal that touches zero often is more difficult to transmit without noise than a signal that touches zero less often.

To reduce the number of times the signal touches zero, one embodiment of an apparatus is provided that phase rotates the symbols represented by the signal. For example, the symbols of one copy of the string of symbols are phase rotated and the symbols of the other copy of the string of symbols are not phase rotated. As a result, even though the two strings represent the same data, the two strings have different characteristics and thus do not appear the same when the strings are transmitted. Phase rotating one string of symbols reduces the number of times the signal touches zero in the time domain so that the signal may be more easily transmitted without noise. The peak-to-average-power ratio (PAPR) may also improved by phase rotating one of the two strings of symbols before the two strings of symbols are transmitted. Phase shifting one of the strings of symbols does not introduce much complexity for the hardware of the apparatus and allows the string of symbols to appear more random.

The following includes definitions of selected terms employed herein. The definitions include various examples and/or forms of components that fall within the scope of a term and that may be used for implementation. The examples are not intended to be limiting. Both singular and plural forms of terms may be within the definitions.

References to "one embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

"Computer-readable medium", as used herein, refers to a non-transitory storage medium that stores instructions and/or data. A computer-readable medium may take forms, including, but not limited to, non-volatile media, and volatile media. Non-volatile media may include, for example, optical disks, magnetic disks, and so on. Volatile media may include, for example, semiconductor memories, dynamic memory, and so on. Common forms of a computer-readable medium may include, but are not limited to, a floppy disk, a flexible disk, a hard disk, a magnetic tape, other magnetic medium, an application specific integrated circuit (ASIC), a programmable logic device, a compact disk (CD), other optical medium, a random access memory (RAM), a read only memory (ROM), a memory chip or card, a memory stick, and other media from which a computer, a processor or other electronic device can read.

"Logic", as used herein, represents a component that is implemented with computer or electrical hardware, a non-transitory computer medium with stored instructions of an executable application or program module, and/or combinations of these to perform any of the functions or actions as disclosed herein, and/or to cause a function or action from another logic, method, and/or system to be performed as disclosed herein. Equivalent logic may include firmware, a microprocessor programmed with an algorithm, a discrete logic (e.g., ASIC), an analog circuit, a digital circuit, a programmed logic device, a memory device containing instructions, and so on. Logic may include at least one circuit, one or more gates, combinations of gates, or other circuit components. Where multiple logics are described, it may be possible to incorporate the multiple logics into one physical logic. Similarly, where a single logic is described, it may be possible to distribute that single logic between multiple physical logics. In one embodiment, one or more of these logics are corresponding structure associated with performing the disclosed and/or claimed functions. Choice of which type of logic to implement may be based on desired system conditions or specifications. For example, if greater speed is a consideration, then hardware/circuitry may be selected to implement functions. If a lower cost is a consideration, then a program module(s) may be selected to implement the functions.

FIG. 1 illustrates one embodiment of an apparatus 100 that is configured to transform the phase of a repeated signal. For example, the apparatus 100 may be a chip configured with a set of integrated circuits that perform the functions of the described logics. The chip is configured to be implemented in a wireless mobile device where the mobile device can communicate with a network via a wireless base station. In general, the apparatus 100 prepares signals for wireless transmission from the mobile device. For example, when the apparatus 100 receives data from a component of the mobile device, the apparatus 100 converts the received data into a format for transmission by a transmitter. The received data may be received from an input line 105 and may be a string of electronic data in a symbol format. In another embodiment, the received data includes a stream of bits of data that the apparatus 100 converts to symbols of electronic data. As used herein, a string of bits/data/symbols will be interchangeable with a stream of bits/data/symbols.

The apparatus 100 includes duplication logic 110 configured to duplicate the string of data to form a duplicate string. Transformation logic 125 modifies one or more phases associated with the string of data, which generates a modified string. Signal generation logic 130 generates a signal for wireless transmission that is comprised of at least the modified string of data and the duplicate string of data (which is a copy of the original string). Although the modified string and the duplicate string represent the same data, they have different properties. The generated signal can then be outputted to a transceiver 115 for wireless transmission.

In one embodiment, the transceiver 115 (e.g., external to the apparatus 100) is configured to transmit the generated signal that is formed from two strings of symbols (the modified string of data and the duplicate string of data). As explained previously, transmitting data that is repeated allows a receiving device 120 to more readily recover and/or correct data if errors occur. More errors may be recovered because two copies of data may be used to correct errors rather than just one copy of data.

However rather than transmitting two identical copies of the data (which has increased chances of touching zero in the time domain), the duplicate string and the modified string are transmitted. As a result, the two strings of symbols do not appear the same when the strings are transmitted. Phase rotating one string of symbols reduces the number of times the signal touches zero in the time domain so that the signal may be more easily transmitted without noise. The receiving device 120 can still correct errors using both strings since the strings represent the same data.

In another embodiment, the phases modified by the transformation logic 125 may be phases as determined from a constellation diagram.

Figure 2:
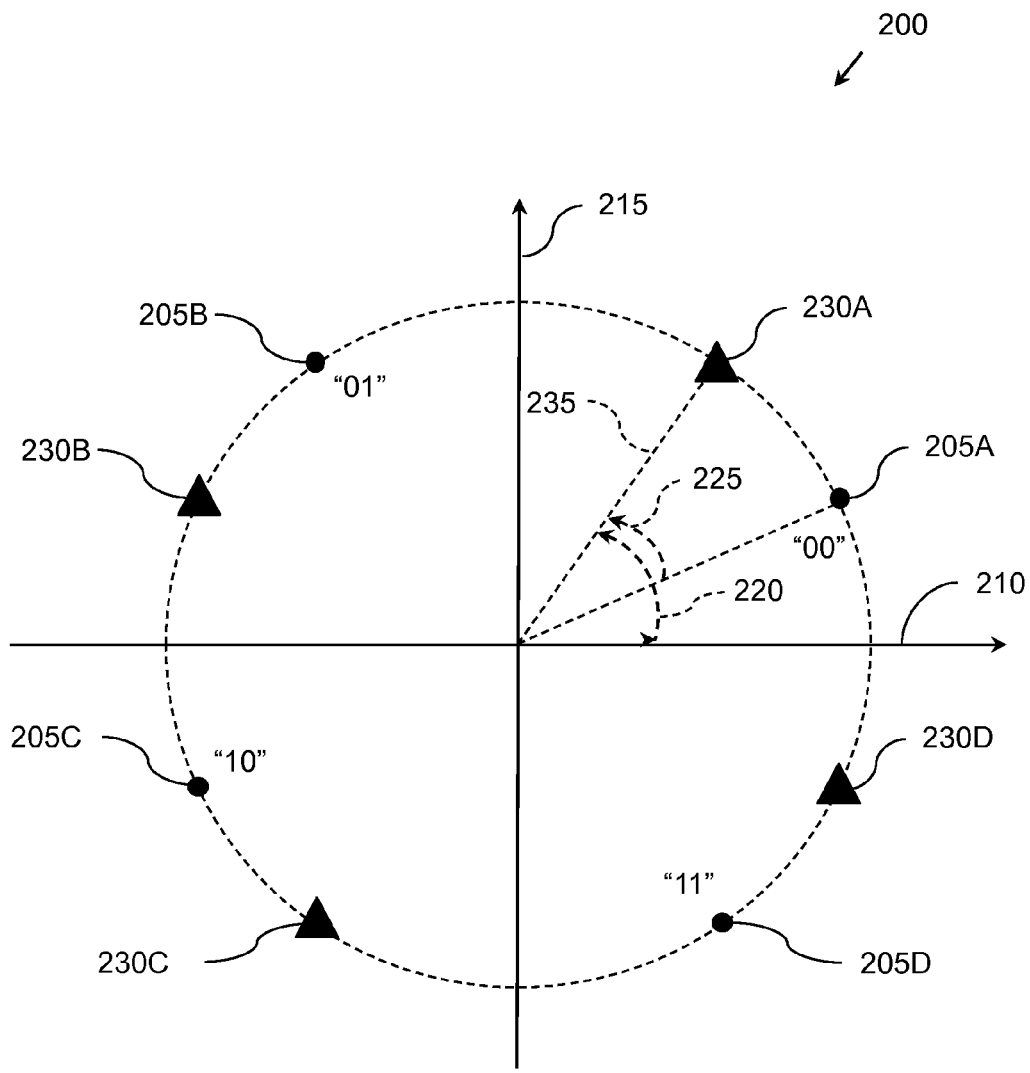
FIG. 2 illustrates one embodiment of a constellation diagram associated with phase transformation of repeated signals.

FIG. 2 represents one embodiment of a constellation diagram 200 and symbol assignments for two bit symbols 205A-D. Of course, other assignments can be used. A phase is the angle between a symbol and the origin of a constellation diagram. To modify the phase of a symbol, the symbol(s) of a duplicated string of data may be moved from original symbol locations to new symbol locations. The new symbol locations can be located a phase angle away from the original locations. In one embodiment, the symbols can also be rotated to new symbol locations from original symbol locations. The rotation amount can be the phase angle. The phase rotation creates a signal that appears more random when transmitted by preventing identical data from being repeatedly transmitted. A random signal has a better frequency spectrum and power efficiency than a repeated signal.

In another embodiment, the amplitudes of the symbols are not changed. Not changing the amplitudes allows a device that eventually receives the symbols (which have been phase rotated) to be easily rotated in a reverse direction to obtain the original form of the signal. Rotating the received symbols in the reverse direction to the original locations does not add complex hardware to the receiver.

With further reference to FIG. 2, the transformation logic 125 of FIG. 1 may form duplicate strings of symbols that correspond to the symbols 205A-D. The duplicate strings of symbols may be formed from a received string of data that corresponds to symbols 205A-D. In one embodiment, the symbol 205A represents the bit values "00" and the symbol 205B represents the bit values "01". The symbols 205C-D represent bit values "10" and "11", respectively. Of course, different bit assignments may be made and the assignments may be grey-scale coded. The symbols 205A-D of FIG. 2 are assigned in a circular arrangement. However, grid or other assignment patterns are possible. Different numbers of symbols may be assigned to the constellation diagram 200 depending on the communication standard being implemented.

The constellation diagram 200 has a real axis 210 and an imaginary axis 215 that have positive and negative portions passing through an origin. The phase of a symbol is based on an angle that a symbol 205A-D makes with respect to the origin. For example, symbol 205A has a phase based on the angle as indicated by reference label 220. Other symbols have different phases. For example, symbol 205B has a phase that is greater than the phase of symbol 205A. In one embodiment, the transformation logic 125 of FIG. 1 modifies the phases of the symbols 205A-D by rotating the symbols counter-clockwise by a rotation angle 225. The rotation angle 225 may be a fixed value for the symbols 205A-D or may be a different value for different symbols 205A-D. The symbols 205A-D may be rotated from locations indicated by the circle shapes to transformed symbols 230A-D represented by the triangle shapes.

The symbols 205A-D of FIG. 2 also have a magnitude component. The magnitude of symbol 205A is shown by the line 235 extending from the symbol 205A to the origin of the real and imaginary axes 205, 210. The overall magnitudes of the symbols 205A-D of FIG. 2 are all the same. However, if the symbols 205A-D are arranged in a grid pattern, the magnitudes would be different. In another embodiment, when the transformation logic 125 modifies the phases of the symbols 205A-D, the amplitude values are unchanged. The symbols 205A-D are modified by spinning the symbols around the origin of the constellation diagram 200 without altering the amplitudes of the symbols 205A-D.

With reference again to FIG. 1, after the transformation logic 125 modifies the phases of the symbols of the string of data, the signal generation logic 130 prepares a signal(s) for wireless transmission as previously explained. The signal generation logic 130 generates the signal that is comprised of the original string of data and the modified string of data. Of course, the signal ready for transmission can also be processed further such as by being mixed, modulated, filtered, and/or further signal processed before the signal ready for transmission is sent to an antenna for wireless transmission.

The modified string of data represents the same data as the original string of data except that the modified string has modified phases as discussed above. Therefore, the signal for wireless transmission includes a string of data and a repeated string of data. By sending data and a repeated copy of the data, the receiving wireless device 120 may more robustly correct for errors in received data. By phase rotating one copy of the data, the data appears more random and has a better peak-to-average-power ratio (PAPR) than two exact copies of the data with the same phases.

In another embodiment, the transformation logic 125 is configured to modify phases associated with a string of data by converting data values of the string of data to complex conjugate values. A complex conjugate of a data value has the same amplitude of the data value, however the imaginary part of the magnitude has a reversed sign. For example, consider symbol 205A of FIG. 2. Symbol 205A may be represented by X+jY, where X and Y are both positive values because symbol 205A is in the upper right quadrant of the constellation diagram 200. The complex conjugate of symbol 205A is X-jY and is located in the lower right quadrant of the constellation diagram 200. The real and imaginary magnitudes X, Y of the conjugate of symbol 205A are then the same so the conjugate symbol of 205A has the same magnitude with a different phase.

In another embodiment, the transformation logic 125 is configured to modify the string by applying a mapping function to at least some data values of the string of data. The mapping function modifies phases associated with at least some data values. In one embodiment, the mapping function includes a hash function that converts a data value to one other data value with the same magnitude but a different phase. Those of ordinary skill in the art will realize that the mapping function may implement other equations, transformation matrices, or other functions that transform the phase of a data value to another phase.

In another embodiment, the apparatus 100 partitions the string of data into two segments of data. The two segments of data may both be replicated by the duplication logic 110. The transformation logic 125 then phase rotates the original two segments of data. The two segments of data may each be phase rotated by a different amount of phase rotation. The transformation logic 125 then combines the two phase rotated segments and the two duplicate segments for transmission to another device.

In another embodiment, the string of data is a first string of data that the duplication logic 110 copies into a first duplicate string of data. The first string of data is represented by symbols that the transformation logic 125 rotates by a first rotation amount to produce a first string of rotated data. The duplication logic 110 duplicates a second string of data to form a second duplicate string of data. The transformation logic 125 then rotates symbols representing the second string of data by a second rotation amount to produce a second string of rotated data. The first rotation amount and the second rotation amount may be different. The signal generation logic 130 prepares and generates a signal for wireless transmission. The signal is comprised of the first string of data rotated data, the first duplicate string of data, the second string of rotated data, and the second duplicate string of data.

In another embodiment for modifying data strings, the duplication logic 110 copies a first string of data to form a first duplicate string of data. The transformation logic 125 converts the first string of data into conjugate values. The conjugate values are then rotated to produce a first string of rotated conjugate values. The duplication logic 110 duplicates a second string of data to form a second duplicate string of data. The transformation logic 125 rotates data values of the second string of data by a rotation amount to produce a second string of rotated data. The data values of the second string of rotated data are not conjugate values of the second string of data. The signal generation logic 130 prepares a signal for wireless transmission comprised of the first duplicate string of data, the first string of rotated conjugate values, the second string of rotated data, and the second duplicate string of data. In other embodiments the first string of data may be conjugated and/or phase rotated and the second string of data may be conjugated and/or phase rotated.

In another embodiment, modifying the phase can be performed as follows. The string of data is phase modified (e.g., rotated) according to:

$$x_k^q = e^{j\psi 1} x_{k+\frac{N_{CBPS}}{4}}^q, \text{ where } k \in \left[0, \frac{N_{CBPS}}{4} - 1\right] \text{ and}$$

$$x_k^q = e^{j\psi 2} x_{k+\frac{N_{CBPS}}{4}}^q, \text{ where } k \in \left[\frac{N_{CBPS}}{2}, \frac{3N_{CBPS}}{4} - 1\right]$$

where "Ψ1" is the first rotation and "Ψ2" is the second rotation. "$N_{CBPS}$" is the number of code bits per symbol, "q" is the $q^{th}$ symbol representing the string of data, "k" is the OFDMA subcarrier index within a symbol. In general $x_k^q$ may be represented by:

$$x_k^q = e^{j\psi} x_{k+\frac{N_{CBPS}}{4}}^q = \frac{1}{\sqrt{2}}\left((2c_k^q - 1) + j\left(2c_{k+\frac{N_{CBPS}}{4}}^q - 1\right)\right)$$

where "c" is the binary value of 0 or 1. Apparatus 100 can be implemented to process signals according to the above equations to generate a sequence of symbols for wireless transmission with rotated phases that correspond to:

$$x = \left[x_0^q, x_1^q, \ldots \text{ ||, } e^{j\psi 1} x_0^q, e^{j\psi 1} x_1^q, \ldots \text{ ||, } x_{\frac{N_{CBPS}}{2}}^q, \right.$$
$$\left. x_{1+\frac{N_{CBPS}}{2}}^q, \ldots \text{ ||, } e^{j\psi 2} x_{\frac{N_{CBPS}}{2}}^q, e^{j\psi 2} x_{1+\frac{N_{CBPS}}{2}}^q, \ldots \right]$$

The resulting sequence has four segments of length $N_{CBPS}$.

Apparatus 100 can be implemented to process signals according to the above equations to generate complex conjugate symbols according to:

$$x_k^q = e^{j\psi}\left(x_{k+\frac{N_{CBPS}}{4}}^q\right)^* = \frac{1e^{j\psi}}{\sqrt{2}}\left((2c_k^q - 1) + j\left(2c_{k+\frac{N_{CBPS}}{4}}^q - 1\right)\right).$$

The corresponding string of complex conjugate symbols is:

$$x = \left[x_0^q, x_1^q, \ldots \text{ ||, } e^{j\psi 1}(x_0^q)^*, e^{j\psi 1}(x_1^q)^*, \ldots \text{ ||, } x_{\frac{N_{CBPS}}{2}}^q, \right.$$
$$\left. x_{1+\frac{N_{CBPS}}{2}}^q, \ldots \text{ ||, } e^{j\psi 2}\left(x_{\frac{N_{CBPS}}{2}}^q\right)^*, e^{j\psi 2}\left(x_{1+\frac{N_{CBPS}}{2}}^q\right)^*, \ldots \right]$$

It will be appreciated that apparatus 100 may modify the phase of a signal with copied data according to other formats. For example, the apparatus 100 may prepare a string of data that is orthogonal frequency-division multiplexed (OFDM). The string of data may be spread quadrature phase shift keying (SQPSK) modulated. The string of data may be dual carrier modulated. The apparatus 100 may phase rotate data for signals processed according to other algorithms that generate repeated data.

The apparatus 100 may be configured in other ways. For example, the apparatus 100 may be configured to receive a wireless signal over one of several wireless communication channels that a base station transmits and receives data on. The signal generation logic 130 may generate a wireless signal that is orthogonal frequency-division multiple access (OFDMA) multiplexed and binary phase shift keying (BPSK) modulated. In other embodiments, the apparatus 100 is a chip that includes at least one integrated circuit. Each logic component can be implemented with at least one circuit that are operably connected to each other. In another embodiment, the wireless transceiver 115 may be at least partially located inside of the apparatus 100.

Figure 3:
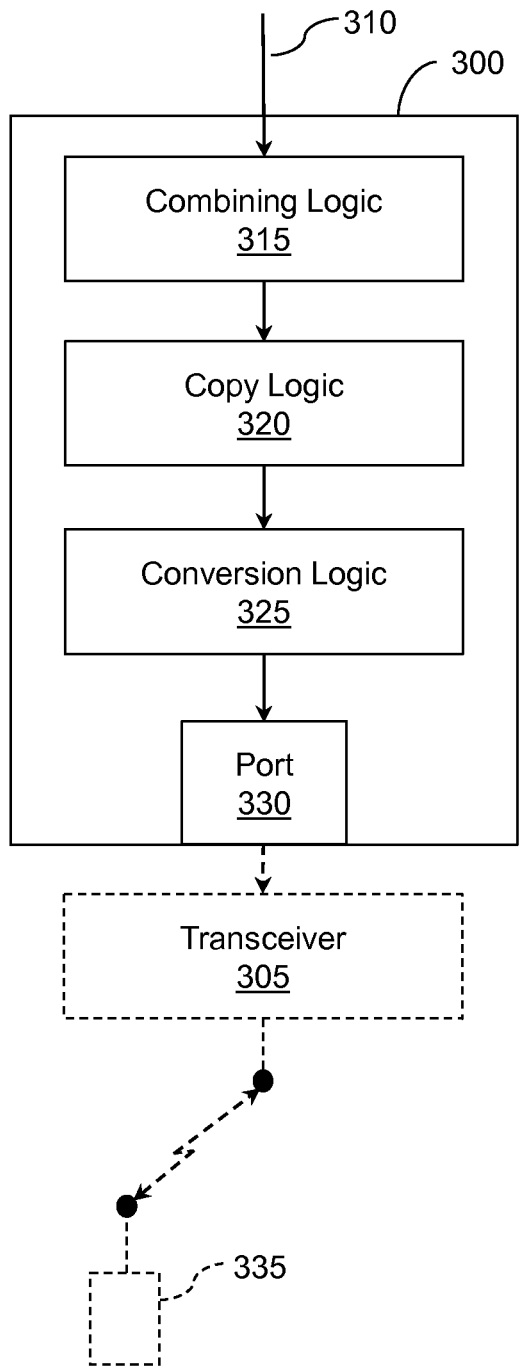
FIG. 3 illustrates another embodiment of an apparatus associated with phase transformation of repeated signals.

FIG. 3 illustrates one embodiment of an apparatus 300 that alters the phase of a copy of data before two copies of data are wirelessly transmitted by a transceiver 305. In one embodiment, the apparatus 300 is implemented as one or more circuits that are configured to perform the described logics and their functions. As previously explained, by altering the phase of one copy of a string of data, identical strings of data are not transmitted. Transmitting data that is different or that appears more random may reduce the high frequency components that are transmitted, may reduce the peak-to-average-power ratio (PAPR), and may be more energy efficient in some environments. Phase shifting a copy of data to be transmitted preserves the benefits of sending two copies of data (e.g. for error correction) while reducing the possible drawbacks of sending two copies of the same data. In one example, the benefits of modulating a signal with spread quadrature phase shift keying (SQPSK) are preserved without significantly increasing the peak-to-average-power ratio (PAPR) or high frequency components of a signal to be wirelessly transmitted.

In one embodiment, the apparatus 300 is a component within an electronic device and is configured to process signals before wireless transmission. For example, the apparatus 300 receives a data stream 310 of multiple bits of data that are to be transmitted. A number of bits from the data stream can form a string of data. One data stream can contain multiple data strings depending on how the strings are formed. The data stream 310 may be received from another component of the electronic device. The data stream 310 is converted into a wireless format in preparation for wireless transmission.

In one embodiment, combining logic 315 implemented in the apparatus 300 with at least a circuit configured to convert the stream of data into symbols. Although the present example at times describes processing a single stream of data, it will be appreciated that multiple streams can be processed. The symbols are converted, for example, by mapping multiple bits of different strings of data to multiple symbols in accordance with a constellation diagram. Refer to the discussion of FIG. 2 for various techniques for using a constellation diagram. The multiple symbols are then mapped to different strings of symbols. The different strings of data can be mapped to other suitable constellation diagrams and more than two bits may be mapped to one symbol. In another embodiment, the combining logic 315 can include slicing logic (not shown) to partition the data stream 310 into different segments of strings of data.

The apparatus 300 is implemented with copy logic 320. The copy logic 320 generates duplicate strings of symbols that are copies of at least some of the strings of symbols from the combining logic 315. In one embodiment, the combining logic 315 creates two strings of data that will correspond to two strings of symbols. The copy logic 320 then generates two more strings of symbols by coping both of the strings of symbols. The four strings of symbols may be later spread quadrature phase-shift key (SQPSK) modulated as discussed below.

In one embodiment, the apparatus 300 comprises conversion logic 325 to map symbols of the duplicate strings of symbols to different locations. The symbols may be mapped to different locations in accordance with a constellation diagram (as previously discussed) to create strings of converted symbols. The symbols that are mapped to different locations have the same amplitude but a different phase.

In one embodiment, the conversion logic 325 maps symbols to different locations by mapping symbol values on a per symbol basis. In another embodiment, the conversion logic 325 maps some strings of symbols to conjugate locations and other strings of symbols to rotated phase locations that do not correspond to conjugate locations. The symbols may be mapped, at least in part, in the frequency domain. The conversion logic 325 can map symbols in the frequency domain, at least in part, by rotating the symbols based on the constellation diagram by a phase angle. The rotating creates new values for the symbols.

In one embodiment, the apparatus 300 outputs the strings of converted symbols to a port 330. The port 330 may be connected to the external transceiver 305 that will wirelessly transmit the symbols to another device 335. In one embodiment where the copy logic 320 copies two strings of symbols, the result is two strings of copied symbols and two original strings. The four strings of symbols are output through the port to the transceiver 305. The transceiver 305 can then process strings such as by spread quadrature phase shift keying (SQPSK) modulation and then transmit the modulated signal to another device 335.

In another embodiment, the copy logic 320 duplicates each string of symbols of a group of strings of symbols. The conversion logic 325 maps each of the duplicate strings of symbols to converted strings of symbols. The port 330 outputs each of the strings of symbols that are not duplicated and each of the converted strings of symbols.

In another embodiment, the conversion logic 325 maps symbols to different locations (based on a selected constellation diagram) by mapping symbol values to unmapped/mapped pairs. For example, the unmapped/mapped pairs may correspond to: [π, 0], [0, π], [π/2, −π/2], [−π/2, π/2] or other values on a one-to-one basis. For example, [π, 0] maps symbols on the negative side of the real axis in the constellation diagram to the positive side of the real axis. The pair [π, 0] rotates a symbol with a phase of 180 degrees (π) by 180 degrees without changing the amplitude of the symbol. Likewise, the pairs of [0, π], [π/2, −π/2], and [−π/2, π/2] rotate corresponding symbols 180 degrees. In one embodiment, the conversion logic 325 maps symbols to different locations by mapping symbols to conjugate symbol value locations on a per symbol basis.

The conversion logic 325 can map symbols to different locations by applying a conversion function to the symbols. The conversion function may be a hash function that converts a data value to one other data value with the same magnitude but a different phase. In other embodiments, the conversion function may implement other equations, transformation matrices, or other functions that transform the phase of data to another phase.

Example methods may be better appreciated with reference to flow diagrams. While for purposes of simplicity of explanation, the illustrated methodologies are shown and described as a series of blocks, it should be appreciated that the methodologies are not limited by the order of the blocks, as some blocks can occur in different orders and/or concurrently with other blocks from that shown and described. Moreover, less than all the illustrated blocks may be required to implement an example methodology. Blocks may be combined or separated into multiple components. Furthermore, additional and/or alternative methodologies can employ additional, not illustrated blocks.

Figure 4:
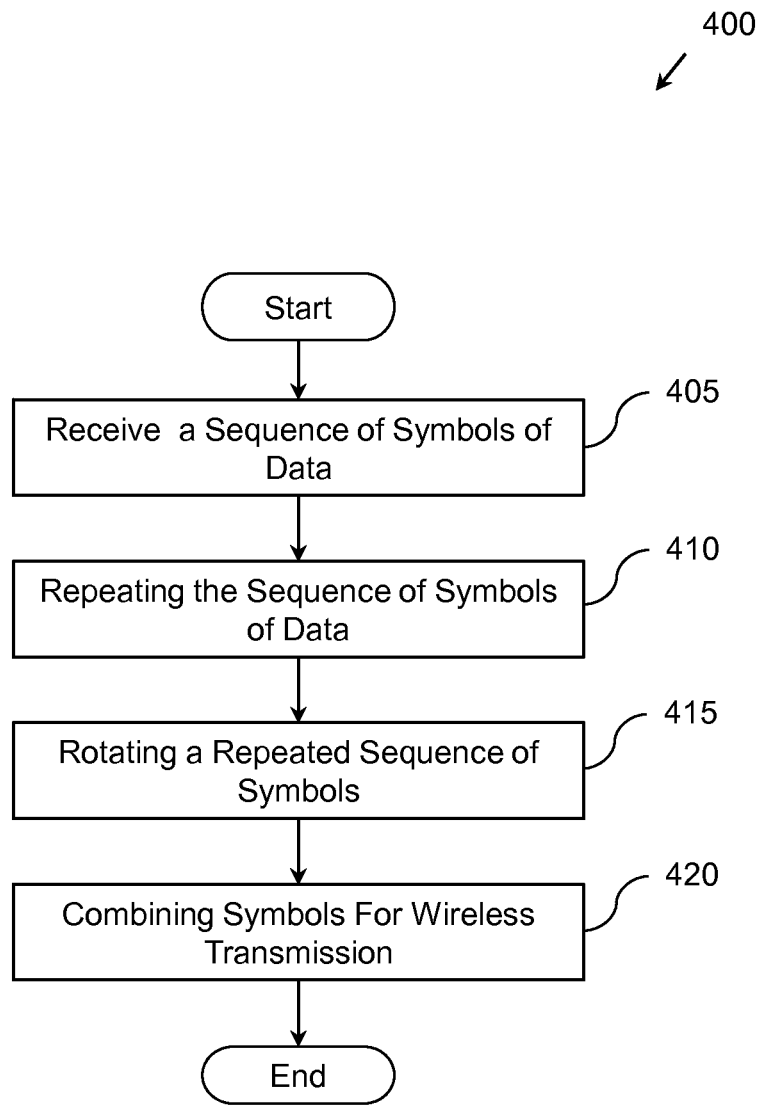
FIG. 4 illustrates one embodiment of a method associated with phase transformation of repeated signals.

FIG. 4 illustrates an embodiment of a method 400 associated with processing and transmitting copies of data via wireless transmission. The data is comprised of electronic symbols that represent bit values.

The method 400 begins by receiving, at 405, at least one sequence of symbols of data. In other embodiments, a stream of data may be received and the data stream may be partitioned into different segments/strings of data. The method 400 will then combine the different segments of data to form strings of symbols.

At least one sequence of symbols is repeated, at 410, to generate a repeated sequence of symbols. In one embodiment, the symbols may be repeated according to various schemes such as the spread quadrature phase-shift key (SQPSK) modulation scheme. For example, the stream of data may be comprised of a first sequence of symbols and a second sequence of symbols. Both of the sequences of symbols are repeated, at 410, to form corresponding copies. Thus there are four sequences of symbols for processing.

The repeated sequence of symbols is rotated, at 415, by a phase to generate a rotated sequence of symbols. By rotating, the method 400 produces a signal that has fewer frequency components than a signal that is produced by combining identical copies of a sequence that are not rotated.

In one embodiment, the repeated sequence of symbols may be rotated by moving symbols in accordance with a selected constellation diagram as previously explained. The symbols may be rotated by a fixed phase from an original location on the constellation diagram. The symbols of a repeated sequence of data may be moved by a fixed phase or the symbols may be moved by different phases. The rotating may be performed on an individual basis so that one rotated sequence of symbols is rotated by a fixed phase and a different rotated sequence of symbols is rotated by a different fixed phase. In one embodiment, the repeated sequence of symbols is rotated, at 415, by mapping the symbols to a conjugate value of the symbols. In other embodiments, the symbols may be rotated, at 415, by rotating the symbols based on a phase value and then mapping the symbols to conjugate values of the symbols.

As previously explained, the symbols may correspond to symbols of a selected constellation diagram (e.g. diagram 200 shown in FIG. 2 or other diagram). The method 400 maps the symbols representing copies of the wireless data to constellation diagram locations with different phase values. Mapping the symbols to locations with different phase values improves the transmission of wireless data by reducing the peak-to-average-power ratio (PAPR) of the wireless data.

In another embodiment, the repeated sequence of symbols is rotated, at 415, by applying a mapping function to at least some data values of the string of data. The mapping function modifies phases associated with at least some data values. The mapping function may be a hash function that converts a data value to one other data value with the same magnitude but a different phase. Of course, other equations, transformation matrices, or other functions that transform the phase of a data value to another phase can be used.

The sequence of symbols and the repeated sequence of symbols are combined, at 420, into a combined signal for wireless transmission. In another embodiment, segments of symbols are combined, at 420, to form a spread quadrature phase shift keying (SQPSK) signal for wireless transmission. For example, the first sequence of symbols is combined, at 420, with a phase rotated copy of the first sequence of symbols. The second sequence of symbols is combined, at 420, with a phase rotated copy of the second sequence of symbols. These sequences of symbols are then combined, at 420, to form the combined signal for wireless transmission. In one embodiment, the combined signal is compatible with mmWave applications.

In another embodiment, the method 400 wirelessly transmits the combined signal to another device. The another device may be a remote wireless device such as a laptop computer, cellular telephone, personal digital assistant, handheld device, or other device that can receive wireless transmission. The combined signal may be transmitted to a base station for further routing over a wireless and/or wired network.

It will be appreciated that in one embodiment, the methods herein may be implemented as computer executable instructions embodied and stored on a computer-readable medium. When executed by a machine (e.g., processor, device) the instructions cause the machine to perform the methods herein and their equivalents. In another embodiment, a chip or circuit board with at least one circuit can be implemented to perform the methods or the functions described herein and/or their equivalents. The methods can also be implemented with circuits, hardware, stored instructions or a combination of circuits, hardware, and stored instructions.

Figure 5:
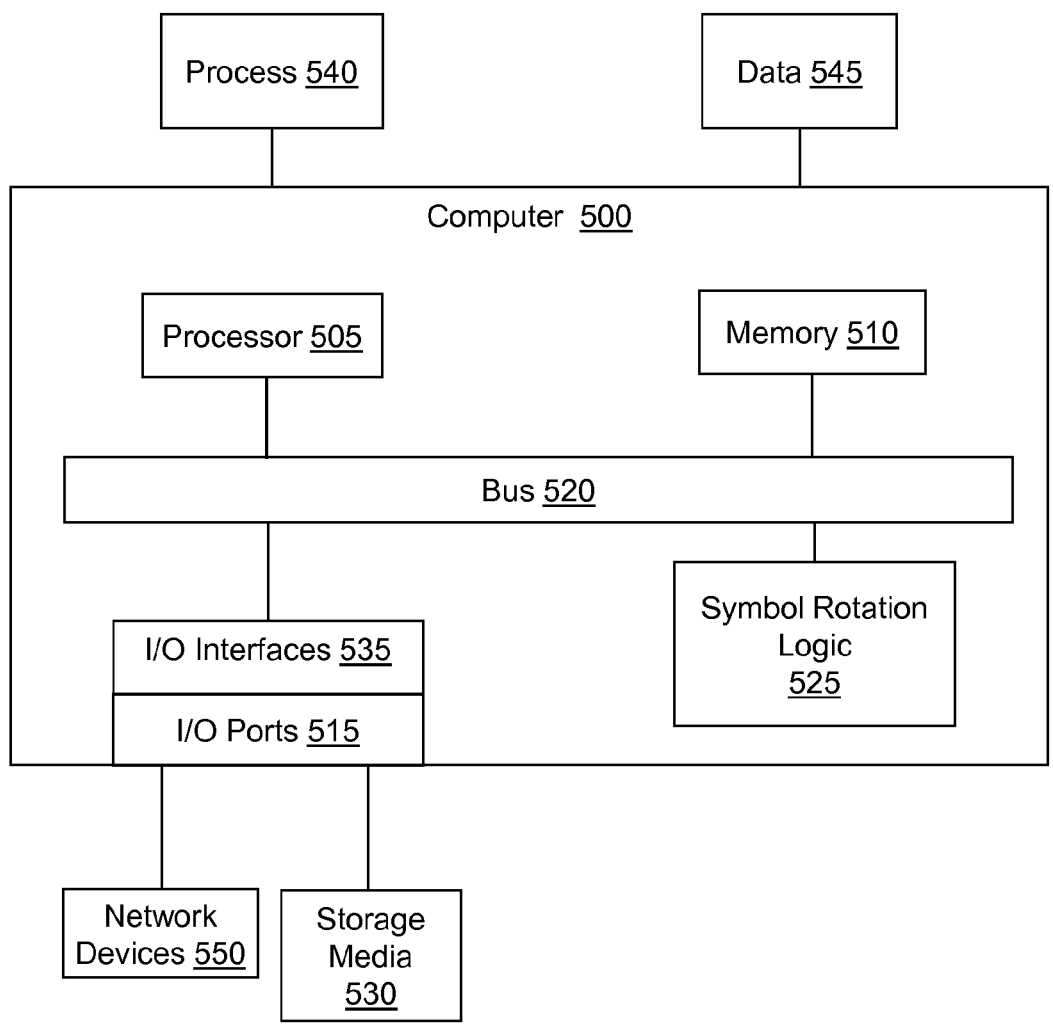
FIG. 5 illustrates an embodiment of a computing environment in which example systems and methods, and equivalents associated with phase transformation of repeated signals may operate.

FIG. 5 illustrates an example computer 500 in which example systems and methods described herein, and equivalents, are implemented. The example computer 500 comprises a processor 505, a memory 510, and input/output ports 515 operably connected by a bus 520. In one example, the computer 500 is implemented with symbol rotation logic 525 configured to rotate or map symbols of one copy of a string of repeated data to other locations that corresponds to shifted phase values. In one embodiment, the symbol rotation logic 525 does not alter the amplitude magnitudes of the mapped symbols.

The symbol rotation logic 525 provides means (e.g., hardware, stored software, and firmware) to process data for transmission. The symbol rotation logic 525 can be implemented similar to apparatus 100 of FIG. 1, apparatus 300 of FIG. 3 and/or combinations of their features. In another embodiment, the symbol rotation logic 525 can include logic implemented, for example, as an ASIC or other type of circuit.

Generally describing an example configuration of the computer 500, the processor 505 may be a variety of various processors including dual microprocessor and other multi-processor architectures. A memory 510 may include volatile memory and/or non-volatile memory. Non-volatile memory may include, for example, read-only memory (ROM), programmable read only memory (PROM), erasable programmable read only memory (EPROM), electronically erasable programmable read only memory (EEPROM), and so on. Volatile memory may include, for example, random access memory (RAM), static random access memory (SRAM), dynamic random access memory (DRAM), and so on.

A storage media 530 may be operably connected to the computer 500 via, for example, through an input/output interface (e.g., card, device) 535 and the input/output port 515. The storage media 530 may be, for example, a magnetic disk drive, a solid state disk drive, a floppy disk drive, a tape drive, a Zip drive, a flash memory card, a memory stick, and so on. Furthermore, the storage media 530 may be a compact disk read-only memory (CD-ROM) drive, a compact disk recordable (CD-R) drive, a compact disk rewritable (CD-RW) drive, a digital video disk read-only memory (DVD ROM), and so on. The memory 510 can store a process 540 and/or a data 545, for example. The storage media 530 and/or the memory 510 can store an operating system that controls and allocates resources of the computer 500.

The bus 520 may be a single internal bus interconnect architecture and/or other bus or mesh architectures. While a single bus is illustrated, it is appreciated that the computer 500 may communicate with various devices, logics, and peripherals using other busses (e.g., peripheral component interconnect express (PCIE), 1394, universal serial bus (USB), Ethernet). The bus 520 can be types including, for example, a memory bus, a memory controller, a peripheral bus, an external bus, a crossbar switch, and/or a local bus.

The computer 500 may interact with input/output devices via the input/output (I/O) interfaces 535 including the symbol rotation logic 525 and the input/output ports 515. Input/output devices may be, for example, a keyboard, a microphone, a pointing and selection device, cameras, video cards, displays, the storage media 530, the network devices 550, and so on. The input/output ports 515 may include, for example, serial ports, parallel ports, and USB ports.

The computer 500 can operate in a network environment and thus may be connected to the network devices 550 via the I/O interfaces 535, and/or the I/O ports 515. Through the network devices 550, the computer 500 may interact with a network. Through the network, the computer 500 may be logically connected to remote computers. Networks with which the computer 500 may interact include, but are not limited to, a local area network (LAN), a wide local area network (WLAN), a wide area network (WAN), and other networks.

While example systems, methods, and so on have been illustrated by describing examples, and while the examples have been described in considerable detail, it is not the intention of the applicants to restrict or in any way limit the scope of the appended claims to such detail. It is, of course, not possible to describe every conceivable combination of components or methodologies for purposes of describing the systems, methods, and so on described herein. Therefore, the invention is not limited to the specific details, the representative apparatus, and illustrative examples shown and described. Thus, this application is intended to embrace alterations, modifications, and variations that fall within the scope of the appended claims.

What is claimed is:

1. An apparatus, comprising:
   duplication logic implemented with at least hardware configured to duplicate a first string of data and a second string of data to form a first duplicate string of data and a second duplicate string of data;
   transformation logic configured to convert the first string of data into a string of conjugate values and to rotate symbols in the second string of data based at least on a constellation diagram to produce a string of rotated symbols, wherein data values of the string of rotated symbols are not conjugate values of the second string of data; and
   signal generation logic configured to generate and output a signal for wireless transmission comprising at least the string of conjugate values, the first duplicate string of data, the string of rotated symbols, and the second duplicate string of data,
   wherein the signal for wireless transmission is output by the signal generation logic to a device that performs the wireless transmission of the signal.

2. The apparatus of claim 1, wherein the signal for wireless transmission is generated to have a smaller peak-to-averagepower ratio (PAPR) than a signal that is generated from two exact copies of the first string of data and the second string of data.

3. The apparatus of claim 1, wherein the transformation logic is configured to modify phases associated with at least some data values of the first string of data by modifying the at least some data values to corresponding conjugate values.

4. The apparatus of claim 1, wherein the transformation logic is configured to apply a mapping function to at least some data values of the first string of data to modify phases associated with the at least some data values.

5. The apparatus of claim 1, wherein the transformation logic is configured to rotate symbols in the second string of data by a rotation amount to produce the string of rotated symbols, wherein the symbols are associated with the constellation diagram.

6. The apparatus of claim 1, wherein the signal generation logic is further configured to modulate the signal for wireless transmission using spread quadrature phase-shift keying prior to transmission.

7. An apparatus, comprising:
  combining logic implemented in at least one integrated circuit and configured (i) to convert an input stream of data into a first string of symbols and (ii) to convert the symbols by mapping multiple bits of different strings of data to multiple symbols of electronic data in accordance with a constellation diagram to form a second string of symbols of electronic data;
  copy logic implemented in the at least one integrated circuit and configured to generate duplicate strings of symbols that are copies of the first string of symbols and the second string of symbols from the combining logic;
  conversion logic implemented in the at least one integrated circuit and configured to map symbols of the duplicate strings of symbols to different phase values to generate strings of converted symbols, where each of the converted symbols has the same original amplitude and a different phase as those of a corresponding symbol in one of the duplicate streams; and
  a port configured to output the first string of symbols, the second string of symbols, and the strings of converted symbols to an external device for wireless transmission.

8. The apparatus of claim 7, wherein the apparatus is further configured to modulate the first string of symbols, the second string of symbols, or the strings of converted symbols using spread quadrature phase-shift keying prior to the wireless transmission.

9. The apparatus of claim 7, wherein the conversion logic is configured to map the symbols on a per symbol basis, wherein the conversion logic is configured to map some symbols to conjugate locations and to map some symbols based on a phase rotation and not conjugate locations.

10. The apparatus of claim 7, wherein the conversion logic is configured to map the symbols to different locations by applying a conversion function to the symbols.

11. The apparatus of claim 7, wherein the conversion logic is configured to map the symbols to different locations by rotating the symbols using the constellation diagram.

12. The apparatus of claim 7, wherein the port is configured to output the first string of symbols, the second string of symbols, and the strings of converted symbols based on spread quadrature phase-shift key (SQPSK) modulation.

13. The apparatus of claim 7, wherein the conversion logic is configured to map the symbols to different locations in a frequency domain.

14. The apparatus of claim 7, wherein the external device is a transceiver configured to transmit the first string of symbols, the second string of symbols, and the strings of converted symbols outputted from the port.

15. The apparatus of claim 7, further comprising:
  slicing logic configured to partition the input stream of data.

16. A method comprising:
  receiving, by at least one first logic circuit, at least one sequence of symbols;
  repeating, by at least one second logic, at least a portion of the at least one sequence of symbols to form at least one repeated sequence of symbols;
  rotating, by the at least one second logic, the at least one repeated sequence of symbols by at least one phase to produce at least one rotated sequence of symbols;
  combining, by the at least one second logic, the at least one sequence of symbols and the at least one rotated sequence of symbols into a combined signal for wireless transmission;
  modulating, by the at least one second logic, the combined signal using spread quadrature phase-shift keying; and
  transmitting, by a transmitter, the modulated combined signal as a wireless signal.

17. The method of claim 16, wherein the rotating is performed on an individual symbol basis so that a first rotated sequence of symbols is rotated by a fixed phase, and a second rotated sequence of symbols is rotated by a different fixed phase.

18. The method of claim 16, wherein the combined signal has fewer frequency components than a signal of combined copies of the at least one sequence that are not rotated.

19. The method of claim 16, wherein the rotating further includes mapping the at least one sequence of symbols to conjugate phase values of the sequence of symbols.

20. The method of claim 16, wherein the combined signal is compatible with mmWave applications.

* * * * *